United States Patent
Lee

(10) Patent No.: US 6,939,753 B2
(45) Date of Patent: Sep. 6, 2005

(54) LIQUID CRYSTAL DISPLAY DEVICE AND FABRICATING METHOD THEREOF

(75) Inventor: Sang Seok Lee, Taegu-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 88 days.

(21) Appl. No.: 09/877,128

(22) Filed: Jun. 11, 2001

(65) Prior Publication Data

US 2001/0050748 A1 Dec. 13, 2001

(30) Foreign Application Priority Data

Jun. 12, 2000 (KR) ......................................... 2000-32079

(51) Int. Cl.$^7$ ..................... G02F 1/1339; G02F 1/1333
(52) U.S. Cl. ......................... 438/153; 438/89; 438/90; 438/190
(58) Field of Search ............................. 349/89–90, 153, 349/190

(56) References Cited

U.S. PATENT DOCUMENTS

| | | | | |
|---|---|---|---|---|
| 5,263,888 A | * | 11/1993 | Ishihara et al. | 445/25 |
| 5,427,858 A | * | 6/1995 | Nakamura et al. | 428/421 |
| 6,128,056 A | * | 10/2000 | Kubota et al. | 349/86 |
| 6,219,126 B1 | * | 4/2001 | Von Gutfeld | 349/153 |
| 6,490,022 B1 | * | 12/2002 | Hoshino | 349/153 |
| 6,636,290 B1 | * | 10/2003 | Glownia et al. | 349/187 |

* cited by examiner

Primary Examiner—Jennifer M. Kennedy
(74) Attorney, Agent, or Firm—Morgan, Lewis & Bockius LLP

(57) ABSTRACT

A liquid crystal display device includes an upper plate, a lower plate, and a liquid crystal. A sealant is formed along edges of the upper and lower plates to join the upper plate with the lower plate, and a protrusion separates the sealant from a picture displaying area at an inner portion of the upper and lower plates. The liquid crystal injected into the picture displaying area.

6 Claims, 10 Drawing Sheets

LIQUID CRYSTAL DISPLAY DEVICE AND FABRICATING METHOD THEREOF

BACKGROUND OF THE INVENTION

1. Field of the Invention

This invention relates to a liquid crystal display, and more particularly to a liquid crystal display device and a method of fabricating a liquid crystal display device that prevents the liquid crystal from being blended with a sealant during liquid crystal injection.

2. Discussion of the Related Art

Generally, a liquid crystal display (LCD) device controls the light transmissivity of liquid crystal cells arranged in a matrix in response to video signals, thereby displaying a picture corresponding to the video signals on a liquid crystal display panel. To this end, the LCD device includes an active area having the liquid crystal cells arranged in a matrix and driving circuits for driving the liquid crystal cells of the active area.

More specifically, the LCD device includes a lower plate, an upper plate, spacers provided between the upper plate and the lower plate to assure a constant cell gap, and a liquid crystal filled in the space defined by the spacers between the upper and lower plates. The lower plate has thin film transistors, for switching the liquid crystal cells, driving circuits for driving the thin film transistors, and signal lines connected between the driving circuits and the thin film transistors mounted onto a lower substrate. The upper substrate is provided with a Black matrix, color filters and a common electrodes disposed sequentially. The color filters each has any one of red, blue and green colors. Such a LCD device is fabricated by separately forming the upper and lower plates, joining the upper and lower plates to each other, injecting a liquid crystal through liquid crystal injection holes provided at the side surface of the structure, coating the liquid crystal injection holes with a end sealant, and curing the end sealant.

A recent liquid crystal injection method that has been developed and widely used is the dispensing method. The dispensing will be described below with reference to FIGS. 1A to 1E and FIGS. 2A to 2B.

FIGS. 1A to 1E schematically show a process of injecting a liquid crystal between the upper plate 2 and the lower plate 1 of the LCD device. First, as shown in FIG. 1A, thin film transistors, gate lines, data lines, pixel electrodes, and an alignment layer (not shown) are provided on a lower plate 1 of the LCD device. Similarly, common electrodes, color filters, black matrix and an alignment layer (not shown) are provided on an upper plate 2 of the LCD device. Then, a sealant 3 is coated on the lower plate 1 to form a frame. As shown in FIG. 1B, a liquid crystal 5 is formed on the lower plate 1 provided within the frame using a liquid crystal dispenser 4. As shown in FIG. 1C, the front side of the lower plate 1 having the liquid crystal 5 is covered with the upper plate 2. Then, as shown in FIG. 1D, heat and pressure 6, are applied to the upper plate 2 to press the upper plate 2 toward the lower plate 1. When the pressure 6 is applied, the liquid crystal 5 spreads and blends with the sealant 3 as seen from portion "A" of FIG. 1E, thereby causing interference problems. Therefore, liquid crystal penetrates into the lower portion of the sealant as seen from portions "B" and "C" of FIGS. 2A and 2B, thereby causing an insufficient liquid crystal injection phenomenon as well as generating a stain at the periphery of the sealant due to liquid crystal contamination at a contact surface between the sealant and the liquid crystal.

SUMMARY OF THE INVENTION

Accordingly, the present invention is directed to a liquid crystal display device that substantially obviates one or more of the problems due to limitations and disadvantages of the related art.

Accordingly, an object of the present invention is to provide a liquid crystal display device and a method of fabricating a liquid crystal display device that prevents liquid crystal from being blended with a sealant using the liquid crystal dispensing method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display device includes an upper plate; a lower plate; a sealant formed along edges of the upper and lower plates to join the upper plate with the lower plate; a protrusion separating the sealant from a picture displaying area at an inner portion of the upper and lower plates.

In another aspect, a method of fabricating a liquid crystal display device includes the steps of providing an upper plate and a lower plate; forming a protrusion between a sealing area provided with a sealant and a picture display area on one of the upper and lower plates; forming the sealant on one of the upper and lower plates; forming a liquid crystal layer on one of the upper and lower plates using a liquid crystal dispensing method; and joining the upper plate with the lower plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Referring to FIGS. 3A to 3E, a liquid crystal display device includes a lower plate 7 and an upper plate 2. The upper plate 2 is provided with an alignment layer (not shown), a common electrode, color filters, and black matrix (not shown). The lower plate 7 is provided with thin film transistors, gate lines, data lines, pixel electrodes, and an alignment layer (not shown).

Figure 1A:
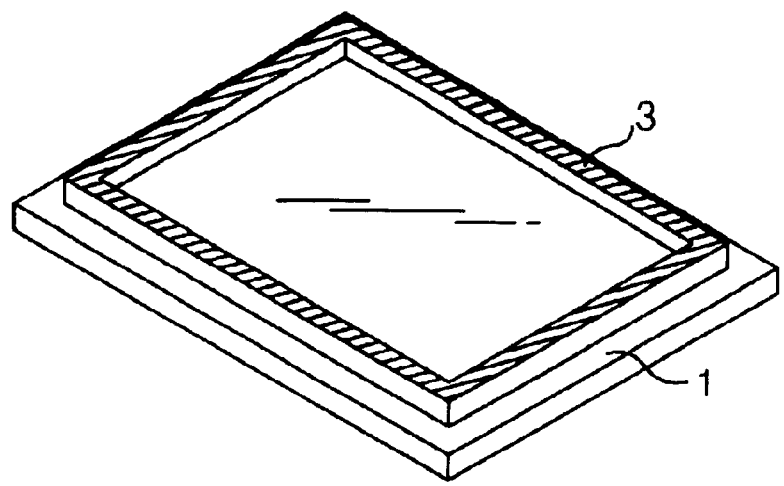
FIGS. 1A to 1E are perspective views showing a method of fabricating a conventional liquid crystal display device.
Figure 1B:
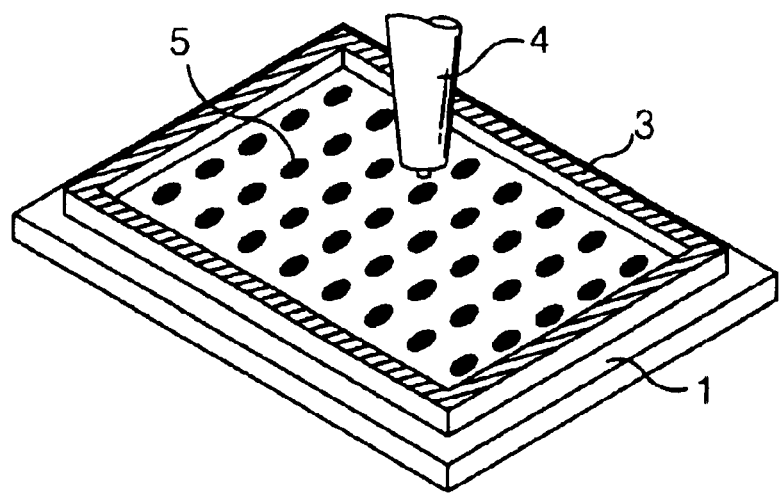
Figure 1C:
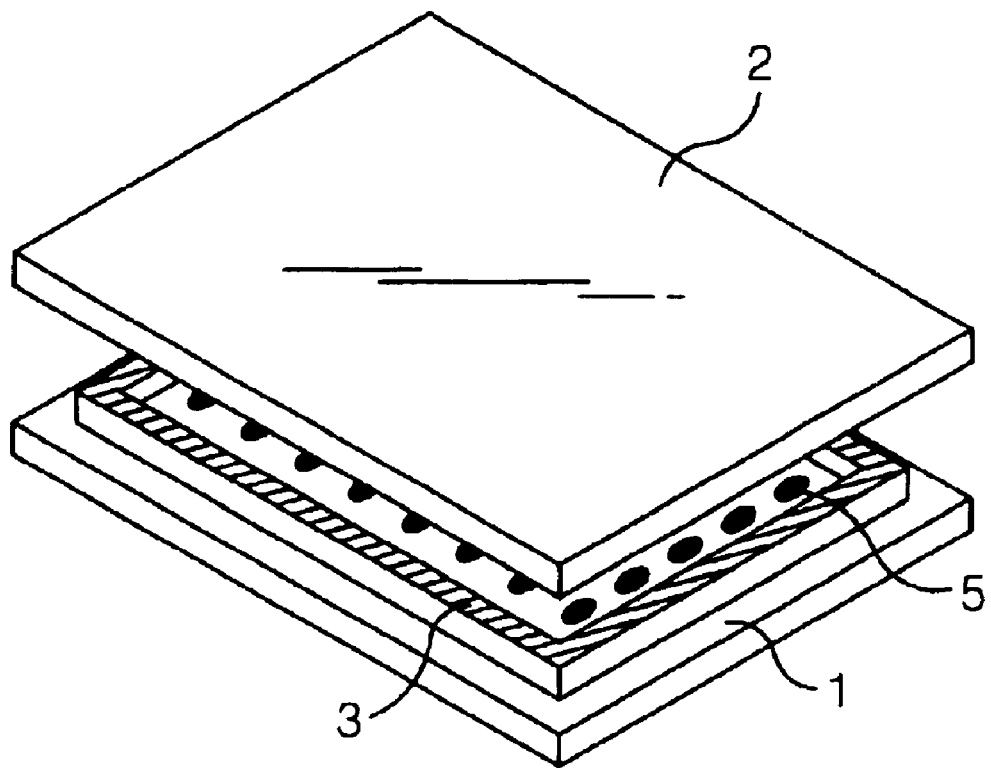
Figure 1D:
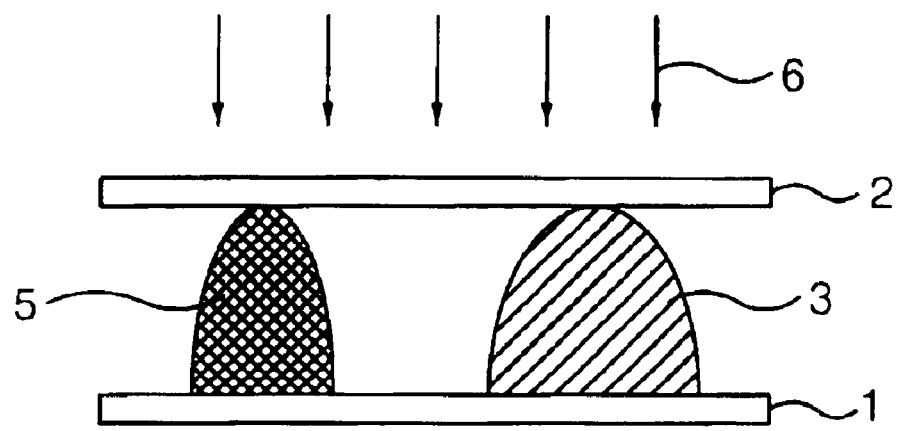
Figure 1E:
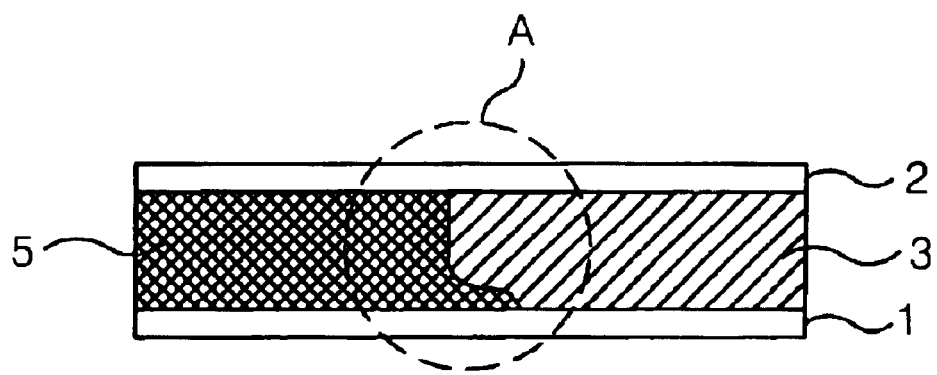
Figure 2A:
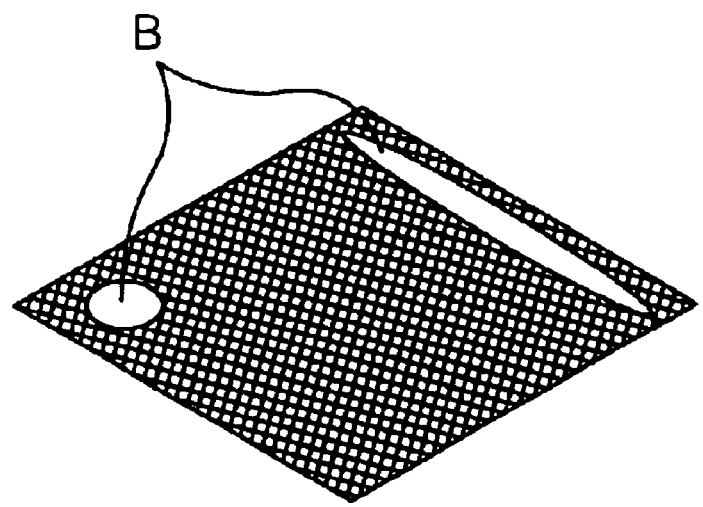
FIGS. 2A and 2B are perspective views showing a problem of the conventional liquid crystal display device.
Figure 2B:
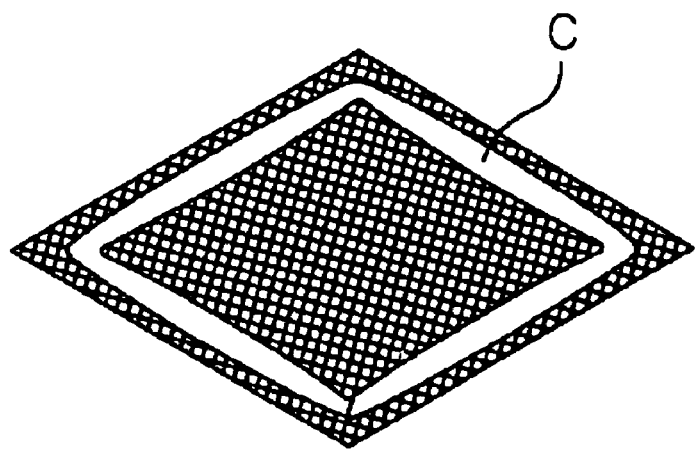
Figure 3A:
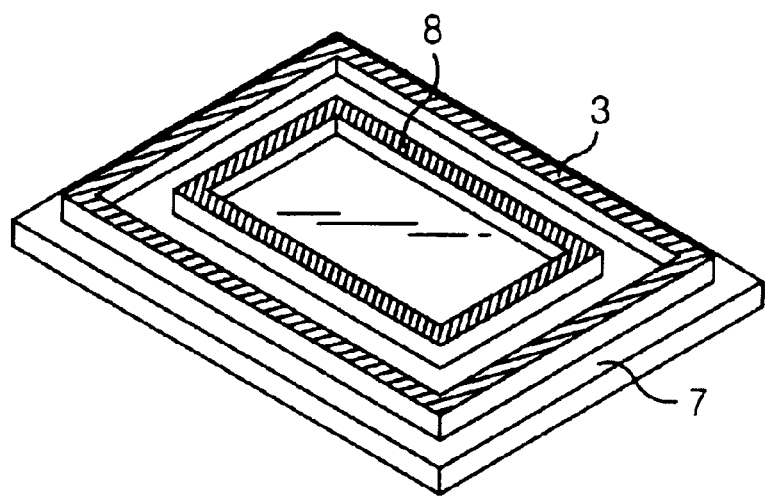
FIGS. 3A to 3E show a method of fabricating a liquid crystal display device according to an embodiment of the present invention.
Figure 3B:
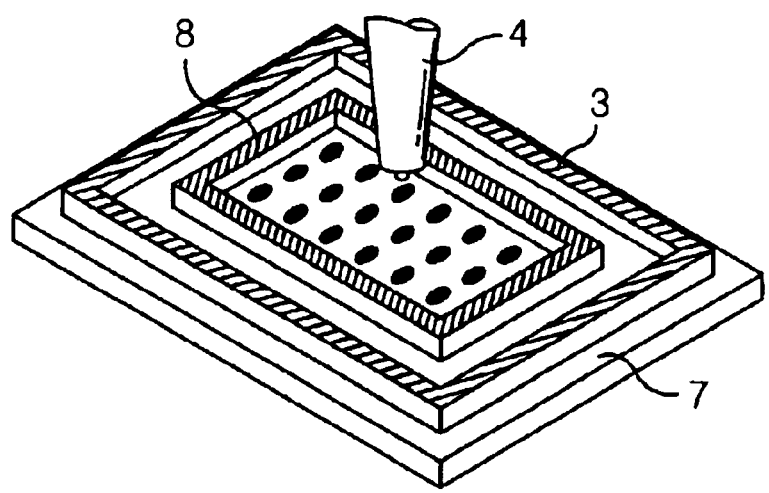
Figure 3C:
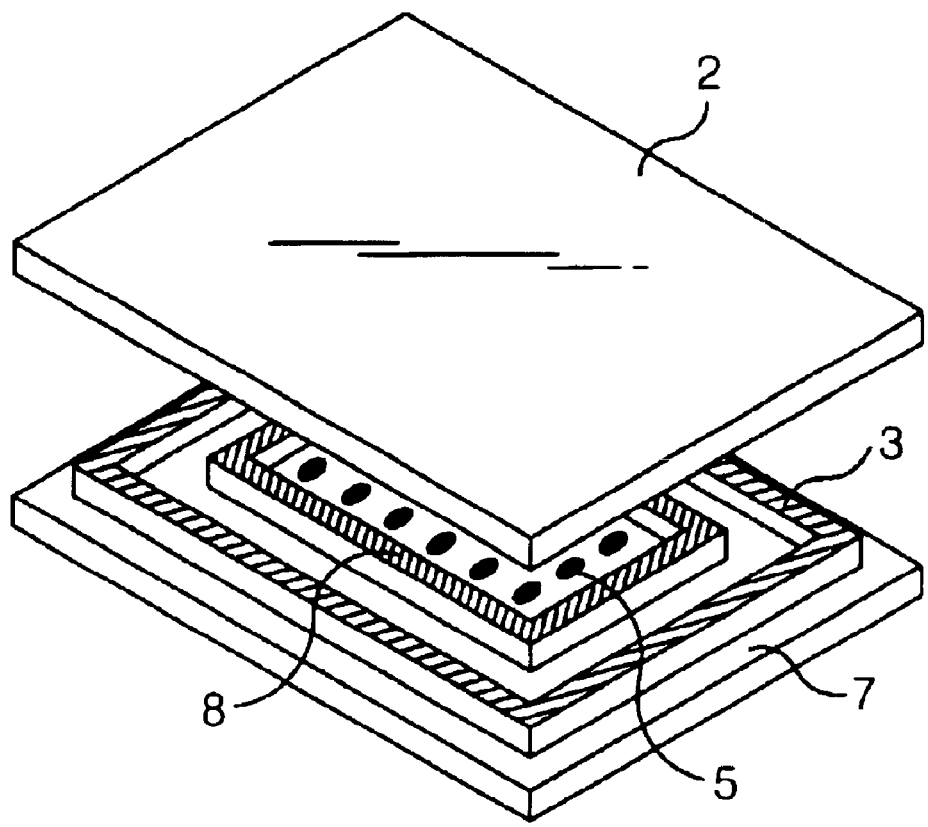
Figure 3D:
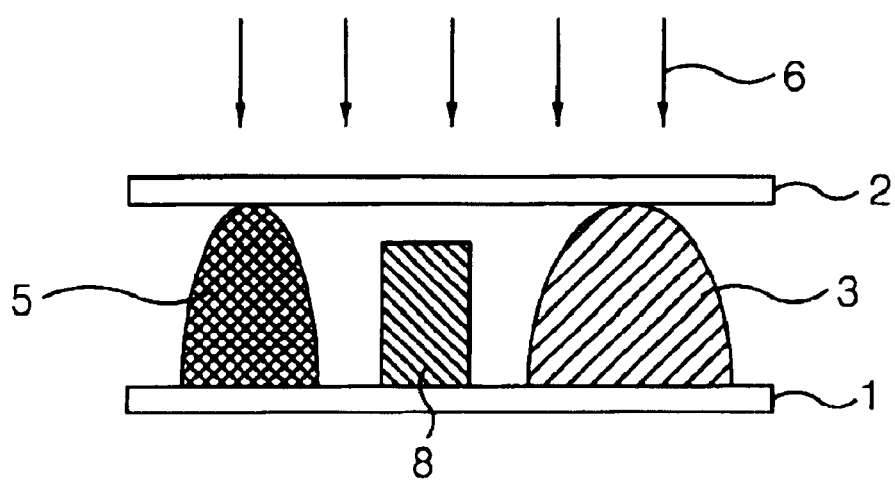
Figure 3E:
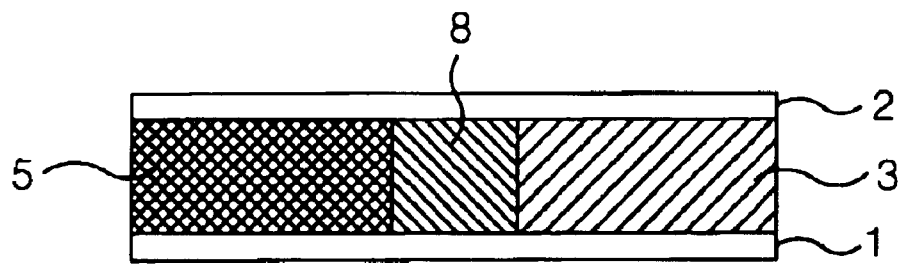

To fabricate the device, as shown in FIG. 3A, at the edge of the lower plate 7, a protrusion 8 is formed from a metal, an indium tin oxide (ITO), or an organic insulating film to define a frame. A sealant 3 is coated between the protrusion 8 formed on the lower plate 7 and the edge of the lower plate 7. Accordingly, the protrusion 8 is positioned between a sealing area and an active area. Then, as shown in FIG. 3B, liquid crystal 5 is evenly dispensed on the lower plate 7 having the protrusion 8, thereby forming a liquid crystal layer. Next, the front side of the lower plate 7 is joined to the rear side of the upper plate 2 as shown in FIG. 3C. Thereafter, as shown in FIG. 3D, heat and pressure 6 at desired conditions are applied onto the upper plate 2 to press the upper plate 2 toward the lower plate 7. At this time, as shown in FIG. 3E, the liquid crystal 5 and the sealant 3 spread as a result of the external pressure 6, but the protrusion 8 provided between the liquid crystal 5 and the sealant 3 prevents the liquid crystal 5 from blending with the sealant 3.

Referring to FIGS. 4A to 4F, the liquid crystal according to another embodiment of the present invention includes an upper plate 10 provided with a protrusion 12 at the edge thereof. The protrusion 12 may be formed from any one of a metal, an indium tin oxide (ITO), and an organic insulating film to define a frame. In the inside of protrusion 12 on the upper plate 10, i.e., in a picture display area, there are disposed black matrix, color filters, a common electrode, and an alignment layer, sequentially.

Figure 4A:
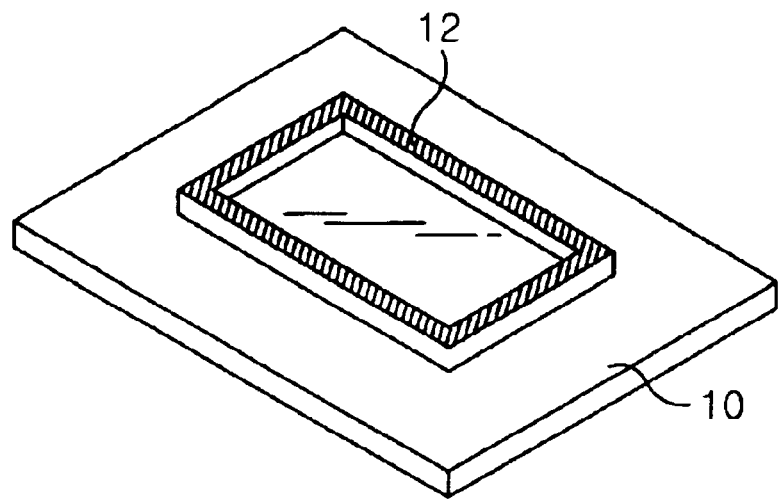
FIGS. 4A to 4F show a method of fabricating a liquid crystal display device according to another embodiment of the present invention.
Figure 4B:
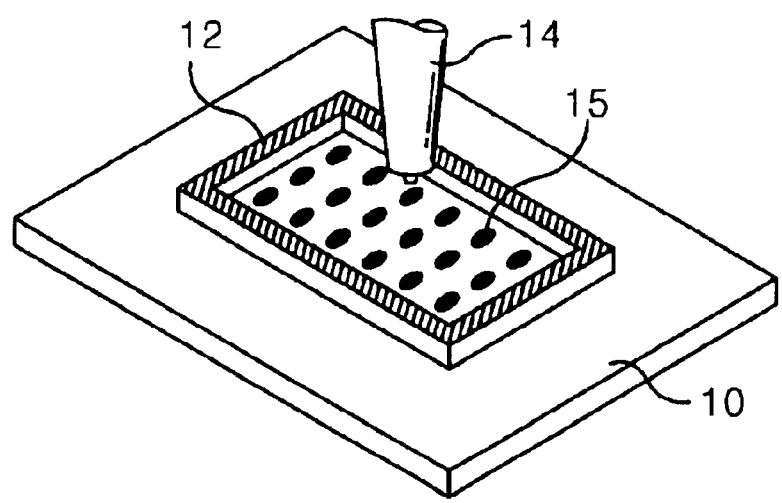
Figure 4C:
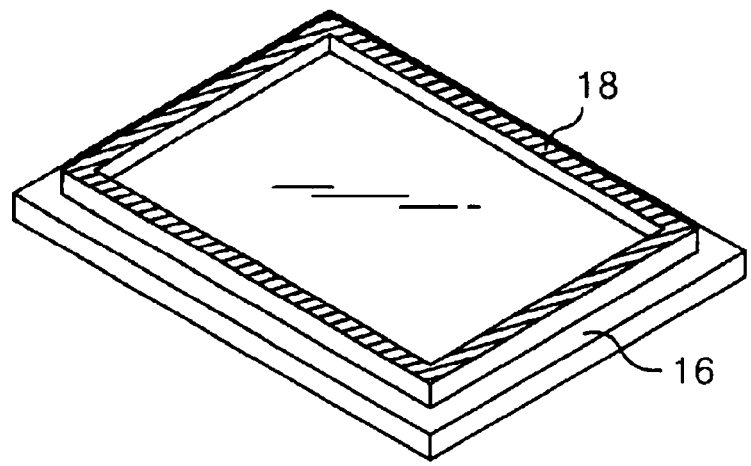
Figure 4D:
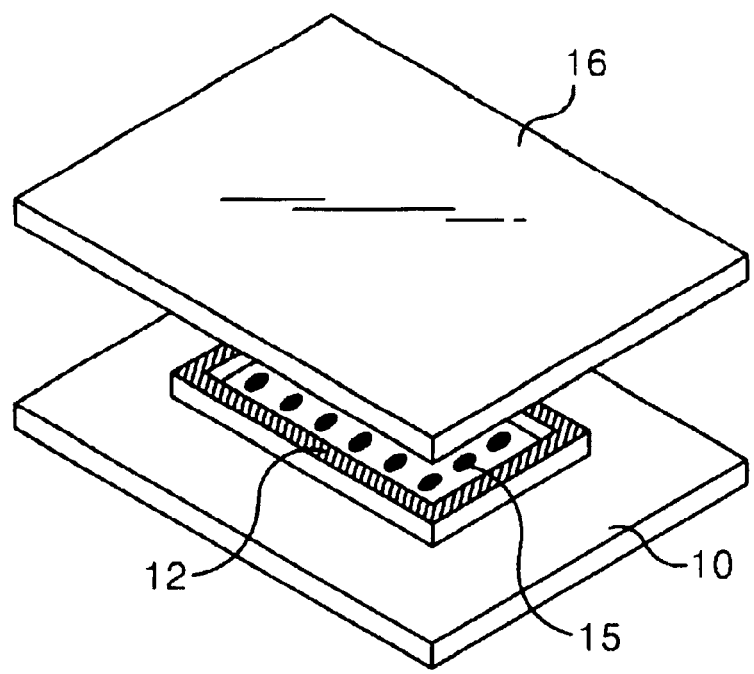
Figure 4E:
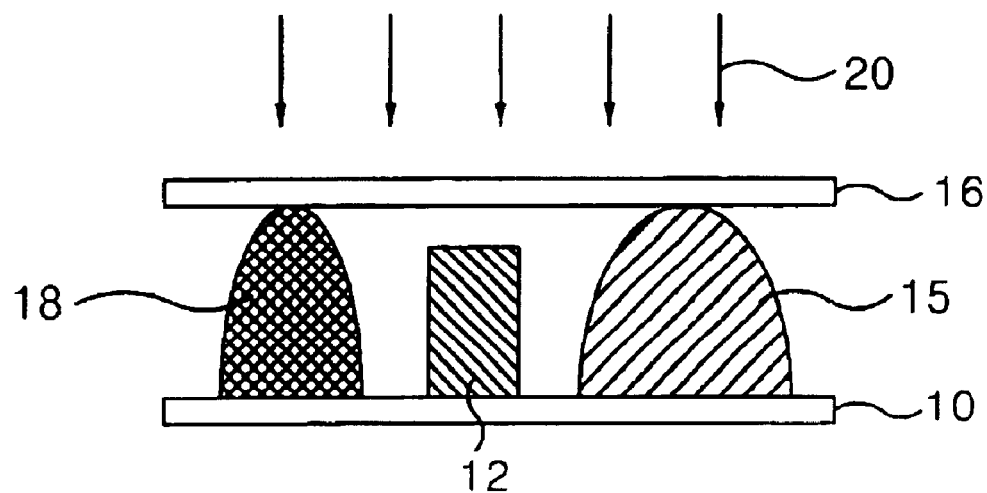
Figure 4F:
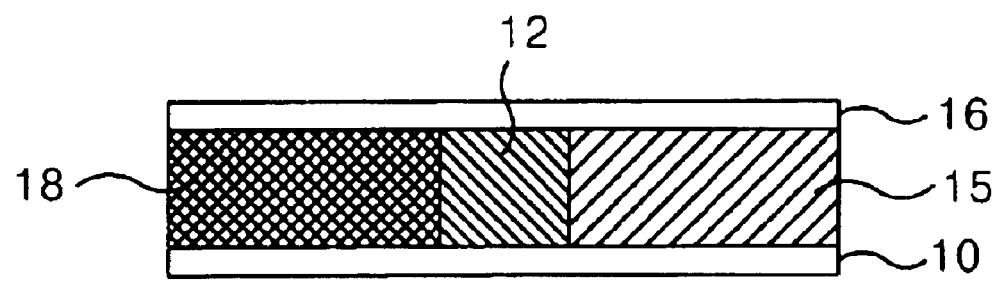

In fabricating the device, as shown in FIG. 4C, a lower plate 16 is provided with a thin film transistor array and an alignment layer thereon. Then, as shown in FIG. 4B, a liquid crystal 15 is evenly dispersed on the rear surface of the upper plate 10 using a liquid crystal dispenser 14, thereby forming a liquid crystal layer. Next, as shown in FIG. 4C, a sealant 18 is coated on the lower plate 16 to form a frame at the edge of the rear side of the lower plate 16 having the thin film transistor array. At this time, as shown in FIG. 4D, the sealant 18 coated on the lower plate 16 is positioned to the outside as compared with the protrusion 12 formed on the upper plates 10. Thereafter, the upper plate 10 having the liquid crystal 15 injected within the region defined by the protrusion 12 and the lower plate 16 coated with the sealant 18 are joined together. Next, as shown in FIG. 4E, heat and pressure 20 at desired conditions are applied onto the surface either one of upper and lower plates 10, 16 to press on that plate, thereby pressing the plates 10, 16 together. At this time, as shown in FIG. 4F, the liquid crystal 15 and the sealant 18 spread as a result of the external pressure 20, but the protrusion 12 between the liquid crystal 15 and the sealant 18 prevents the liquid crystal 15 from blending with the sealant 18.

As described above, according to the present invention, a protrusion is provided between the liquid crystal and the sealant, thereby preventing the liquid crystal from blending with the sealant as well as preventing a stain from being generated at the periphery of the sealant due to contact between the liquid crystal and the sealant.

It will be apparent to those skilled in the art that various modifications and variations can be made in the liquid crystal display device of the present invention without departing from the spirit or scope of the invention. Thus, it is intended that the present invention covers the modifications and variations of this invention provided they come within the scope of the appended claims and their equivalents.

The present application claims the benefit of Korean Patent Application No. 2000-32079 filed in the Republic of Korea on Jun. 12, 2000, which is hereby incorporated by reference.

What is claimed is:

1. A liquid crystal display device, comprising:

two plates, one plate of the two plates having a protrusion thereon for defining a picture displaying area, the protrusion being formed of indium-tin-oxide (ITO);

a sealant formed along edges of the other plate of the two plates, a position of the sealant being outside of the protrusion; and a liquid crystal evenly dispersed into the picture displaying area such that the protrusion completely contains the liquid crystal in the picture displaying area.

2. The liquid crystal display device according to claim 1, wherein the liquid crystal is dispersed using a liquid crystal dispensing method.

3. A method of fabricating a liquid crystal display device, comprising the steps of:

providing two plates, one plate of the two plates having a protrusion thereon for defining a picture display area, the protrusion being formed of indium-tin-oxide (ITO);

forming the sealant on the other one of the two plates, a position of the sealant being outside of the protrusion;

evenly dispensing liquid crystal onto the picture display area using a liquid crystal dispensing method; and joining the two plates.

4. The method according to claim 3, wherein the liquid crystal remains completely contained in the picture display area during the step of joining the upper plate with the lower plate.

5. A liquid crystal display device, comprising:

two plates, one plate of the two plates having a protrusion thereon for defining a picture displaying area, the protrusion being formed of metal;

a sealant formed along edges of the other plate of the two plates, a position of the sealant being outside of the protrusion; and a liquid crystal evenly dispersed into the picture displaying area such that the protrusion completely contains the liquid crystal in the picture displaying area.

6. A method of fabricating a liquid crystal display device, comprising the steps of:

providing two plates, one plate of the two plates having a protrusion thereon for defining a picture display area, the protrusion being formed of metal;

forming the sealant on the other one of the two plates, a position of the sealant being outside of the protrusion;

evenly dispensing liquid crystal onto the picture display area using a liquid crystal dispensing method; and joining the two plates.

* * * * *